US012739609B2

(12) United States Patent
Zhang et al.

(10) Patent No.: US 12,739,609 B2
(45) Date of Patent: Sep. 15, 2026

(54) GENERATION METHOD AND ANALYSIS METHOD FOR DISCOVERY MESSAGE AND DEVICE

(71) Applicant: GUANGDONG OPPO MOBILE TELECOMMUNICATIONS CORP., LTD., Dongguan (CN)

(72) Inventors: Boyuan Zhang, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 325 days.

(21) Appl. No.: 18/475,704

(22) Filed: Sep. 27, 2023

(65) Prior Publication Data

US 2024/0022893 A1 Jan. 18, 2024

Related U.S. Application Data

(63) Continuation of application No. PCT/CN2021/092217, filed on May 7, 2021.

(51) Int. Cl.

| | |
|---|---|
| ***H04W 4/00*** | (2018.01) |
| ***H04W 8/00*** | (2009.01) |
| ***H04W 48/20*** | (2009.01) |
| *H04W 92/18* | (2009.01) |

(52) U.S. Cl.

CPC ........... *H04W 8/005* (2013.01); *H04W 48/20* (2013.01); *H04W 92/18* (2013.01)

(58) Field of Classification Search

CPC ...... H04W 8/005; H04W 48/20; H04W 92/18

USPC ........................................................ 370/329

See application file for complete search history.

(56) References Cited

U.S. PATENT DOCUMENTS

| | | | | |
|---|---|---|---|---|
| 9,942,917 | B2 * | 4/2018 | Faurie | H04W 72/23 |
| 10,064,212 | B2 * | 8/2018 | Faurie | H04W 72/23 |
| 10,827,501 | B2 * | 11/2020 | Yu | H04W 72/51 |
| 11,026,246 | B2 * | 6/2021 | Wu | H04W 72/569 |
| 11,490,365 | B2 * | 11/2022 | Lin | H04L 5/0055 |
| 11,582,719 | B2 * | 2/2023 | Lin | H04W 28/0247 |
| 11,943,652 | B2 * | 3/2024 | Adjakple | H04W 76/14 |
| 11,991,607 | B2 * | 5/2024 | Bharadwaj | H04L 5/0044 |
| 12,120,545 | B2 * | 10/2024 | Ali | H04W 4/40 |

(Continued)

FOREIGN PATENT DOCUMENTS

| | | | |
|---|---|---|---|
| CN | 108834107 | A | 11/2018 |
| WO | 2016164670 | A1 | 10/2016 |
| WO | 2020150495 | A1 | 7/2020 |

OTHER PUBLICATIONS

3rd Generation Partnership Project; Technical Specification Group Services and System Aspects;Study on Architecture Enhancements to ProSe UE-to-Network Relay(Release 15), dated Dec. 22, 2017 (81 pages).

(Continued)

*Primary Examiner* — Marceau Milord
(74) *Attorney, Agent, or Firm* — Ladas & Parry LLP

(57) ABSTRACT

A generation method and apparatus and an analysis method for a discovery message are provided. The generation method is performed by a first User Equipment (UE), and includes: generating message content through at least one layer of a PC5-S layer and a PC5-Radio Resource Control (RRC) layer; and packaging the message content as the discovery message through the PC5-S layer.

15 Claims, 5 Drawing Sheets

(56) References Cited

U.S. PATENT DOCUMENTS

| | | | | |
|---|---|---|---|---|
| 2007/0183374 | A1* | 8/2007 | Classon | H04W 36/0072 370/338 |
| 2016/0338095 | A1* | 11/2016 | Faurie | H04W 72/23 |
| 2018/0014313 | A1* | 1/2018 | Yi | H04W 72/23 |
| 2018/0070281 | A1* | 3/2018 | Wu | H04W 48/20 |
| 2018/0084481 | A1 | 3/2018 | Wang et al. | |
| 2018/0368173 | A1* | 12/2018 | Shaheen | H04W 72/23 |
| 2019/0053215 | A1* | 2/2019 | Yu | H04B 7/15542 |
| 2019/0239147 | A1* | 8/2019 | Chun | H04W 88/06 |
| 2019/0239242 | A1* | 8/2019 | Yi | H04W 72/1268 |
| 2019/0350047 | A1* | 11/2019 | Shan | H04W 8/005 |
| 2020/0008183 | A1* | 1/2020 | Chen | H04W 72/20 |
| 2020/0196327 | A1* | 6/2020 | Zhang | H04W 28/0268 |
| 2021/0051511 | A1* | 2/2021 | Ali | H04W 28/04 |
| 2022/0053464 | A1* | 2/2022 | Yu | H04W 72/02 |
| 2023/0071186 | A1* | 3/2023 | Lu | H04W 48/08 |
| 2023/0217221 | A1* | 7/2023 | Bharadwaj | H04L 5/0094 370/329 |

OTHER PUBLICATIONS

European Search Report, European Patent Application No. 21939700.7, mailed May 3, 2024 (13 pages).

Ericsson on the sidelink QoS flow and radio bearer;3GPP TSG-RAN WG2 #106 R2-1907364 ,May 17, 2019 (May 17, 2019), p. 3;1 14 26 39,51-55.

Lenovo Motorola Mobility Identification PC5-S andIdentification on PC5 RRC and RRC Procedures;3GPP TSG-RAN WG2 Meeting #107bis R2-1912566, Oct. 18, 2019 (Oct. 18, 2019), p. 3;1 14 26 39,51-55.

R2-2006556, Qualcomm 111e Meeting Proposal, Aug. 7, 2020, 06:25:53.

R2-2006612, CATT 111e Meeting Proposal, Aug. 7, 2020, 04:24:10.

R2-2006738, ZTE 111e Meeting Proposal, Aug. 7, 2020,06:21:41.

R2-2006931, Intel 111e Meeting Proposal, Aug. 7, 2020,03:51:28.

R2-208045, LG 111e Meeting Proposal, Aug. 7, 2020,05:31:34.

International Search Report and Written Opinion, International Application No. PCT/CN2021/092217, mailed Jan. 30, 2022 (16 pages).

* cited by examiner

GENERATION METHOD AND ANALYSIS METHOD FOR DISCOVERY MESSAGE AND DEVICE

CROSS REFERENCE TO RELATED APPLICATIONS

The present disclosure is a continuation of International Patent Application No. PCT/CN2021/092217, filed on May 7, 2021, the content of which is herein incorporated by reference in their entireties.

TECHNICAL FIELD

Embodiments of the present disclosure relates to the field of communication technology, in particular to a generation method for a discovery message, an analysis method for a discovery message, and a device.

BACKGROUND

The sidelink technology is a near-field communication technology that enables information-direct-connection between User Equipments (UEs) through a PC5 interface.

A UE may perform a sidelink discovery based on the sidelink technology. For example, the UE may broadcast a discovery message through the PC5 interface, to enable other UEs to discover the UE based on the discovery message.

SUMMARY

Some embodiments of the present disclosure provide a generation method for a discovery message, an analysis method for a discovery message, and a device. Technical solutions are as follows.

In an aspect of embodiments of the present disclosure, a generation method for a discovery message is provided. The method is performed by a first User Equipment (UE), and the method includes: generating message content through at least one layer of a PC5-S layer and a PC5-Radio Resource Control (RRC) layer; and packaging the message content as the discovery message through the PC5-S layer.

In an aspect of embodiments of the present disclosure, an analysis method for a discovery message is provided. The method is performed by a second User Equipment (UE), and the method includes: receiving, through a PC5-S layer, the discovery message broadcast by a first UE; and analyzing the discovery message through at least one layer of the PC5-S layer and a PC5-Radio Resource Control (RRC) layer.

In an aspect of embodiments of the present disclosure, a User Equipment (UE) is provided. The UE includes a processor; the processor is configured to generate message content through at least one layer of a PC5-S layer and a PC5-Radio Resource Control (RRC) layer; and the processor is configured to package the message content as a discovery message through the PC5-S layer.

BRIEF DESCRIPTION OF THE DRAWINGS

In order to describe technical solutions in some embodiments of the present disclosure more clearly, the following will briefly introduce the figures needed to be used in the description of the embodiments. Obviously, the figures in the following description are only some embodiments of the present disclosure. For those skilled in the art, other figures may be obtained from these figures without paying any creative labor.

DETAILED DESCRIPTIONS

In order to enable the purposes, technical solutions, and advantages of the present disclosure to be clearer, embodiments of the present disclosure will be described in detail below in combination with the accompanying figures.

Network architectures and business scenarios described in some embodiments of the present disclosure are intended to more clearly describe the technical solutions of some embodiments of the present disclosure, and do not constitute limitation to the technical solutions provided by some embodiments of the present disclosure. As known to those skilled in the art, with evolution of the network architectures and emergence of new business scenarios, the technical solutions provided by some embodiments of the present disclosure are also applicable to similar technical problems.

Figure 1:
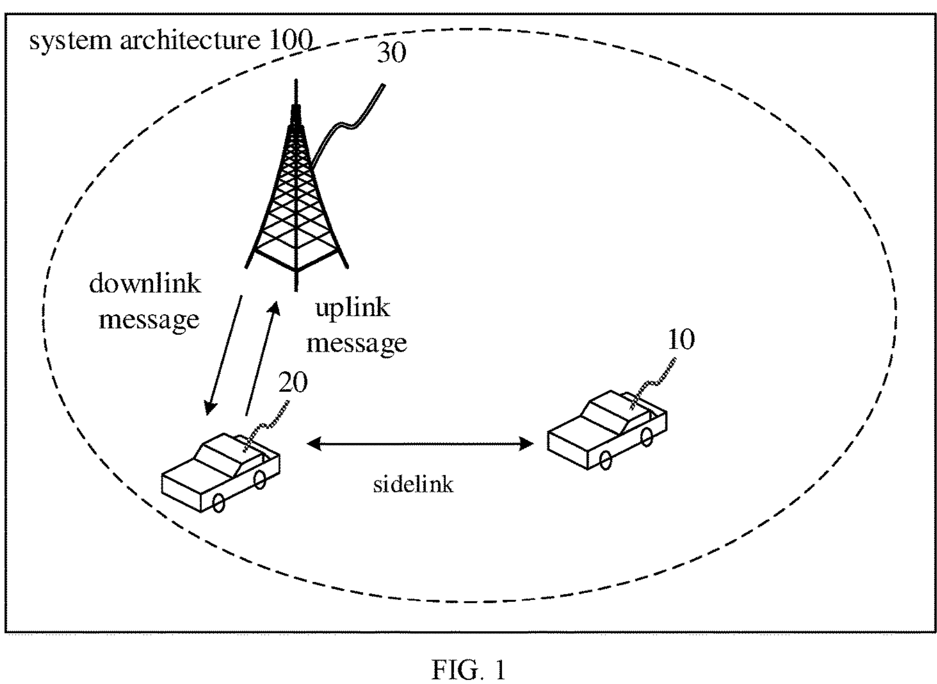
FIG. 1 is a schematic view of a communication system provided by some embodiments of the present disclosure.

As shown in FIG. 1, FIG. 1 is a schematic view of a communication system provided by some embodiments of the present disclosure. The communication system may include a remote terminal 10, a relaying terminal 20, and a network device 30.

The remote terminal 10 refers to a UE that may communicate with the relaying terminal 20 through a sidelink, and then communicate with a network device or other remote terminals through a relay of the relaying terminal 20. The number of the remote terminals 10 is multiple, and a cell managed by each network device 30 may has one or more remote terminals 10. The remote terminal 10 may include various handheld devices, on-board devices, wearable devices, computing devices, or other processing devices connected to wireless modems, as well as various forms of user devices, mobile stations (MS), and so on, which have wireless communication functions. For the convenience of description, the aforementioned devices are collectively referred to as remote terminals.

The relaying terminal 20 refers to a UE that may communicate with the remote terminal 10 through a sidelink. The number of the relaying terminals 20 is multiple, and a cell managed by each network device 30 may has one or more relaying terminals 20. The relaying terminal 20 may include various handheld devices, on-board devices, wearable devices, computing devices, or other processing devices connected to wireless modems, as well as various forms of user devices, mobile stations (MS), and so on, which have wireless communication functions. For the convenience of description, the aforementioned devices are collectively referred to as relaying terminals.

The network device 30 is a device configured to provide wireless communication functions for the remote terminal 10 and the relaying terminal 20. The network device 30 may include various forms of macro base stations, micro base stations, relay stations, access points, etc. In systems with different wireless access technologies, the name of the network device 30 may be different. For example, in a 5G NR system, the network device 30 may be called a 5G base station (5G Node B, gNodeB/gNB).

The remote terminal 10 and the relaying terminal 20 may establish a connection through a sidelink and communicate with each other through a direct communication interface (such as a PC5 interface). The relaying terminal 20 may broadcast a message of the network device to the remote terminal through the sidelink, in this way, the network relay may be realized. Communication data may be directly transmitted between the remote terminal 10 and the relaying terminal 20 through the sidelink, which is different from a traditional cellular system in which the communication data is received or transmitted through the network device. The transmission process has characteristics of short time delay, low overhead, etc., and is suitable for communication between two terminals with close geographical locations (such as an on-board device and other peripheral devices with close geographical locations). The network device 30 and the relaying terminal 20 may communicate with each other through some air technologies, such as an Uu interface.

In some embodiments of the present disclosure, the UE (including the remote terminal 10 and the relaying terminal 20) may support broadcasting a discovery message, so that other UEs may discover the UE by receiving the discovery message.

The technical solutions of some embodiments of the present disclosure may be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Frequency Division Duplex (FDD) system, an Advanced Long Term Evolution (LTE-A) system, a New Radio (NR) system, an evolution system of the NR system, a LTE-based access to unlicensed spectrum (LTE-U) system, a NR-based access to unlicensed spectrum (NR-U) system, a Non Terrestrial Networks (NTN) system, a Universal Mobile Telecommunications System (UMTS), a Worldwide Interoperability for Microwave Access (WiMAX) communication system, a Wireless Local Area Networks (WLAN), a Wireless Fidelity (WiFi), a next-generation communication system, or other communication systems.

Generally speaking, a traditional communication system supports a limited number of connections and is easy to be realized. However, with the development of communication technology, a mobile communication system may not only support a traditional communication, but also support, for example, a device to device (D2D) communication, a machine to machine (M2M) communication, a Machine Type Communication (MTC), a Vehicle to Vehicle (V2V) communication, or a Vehicle to everything (V2X) communication, etc. Some embodiments of the present disclosure may also be applied to these communication systems.

Before the technical solutions of the present disclosure are introduced, some background technical knowledges involved in the present disclosure will be introduced.

In the LTE of Rel (Release)-13, a sidelink discovery is defined as a process in which the UE supporting the sidelink discovery uses an Evolved Universal Territorial Radio Access (E-UTRA) to directly communicate with other UEs through a PC5 interface to discover other UEs nearby. The sidelink discovery is supported both when the UE is in the service of the E-UTRAN and when the UE is not in the coverage of the E-UTRA. Only a public-security terminal that supports Proximity based Service (ProSe) may execute the sidelink discovery when the coverage of the E-UTRA is exceeded. For the sidelink discovery of the public-security terminal, an allowed frequency may be pre-configured in the UE, and the UE may use the frequency even if the frequency exceeds the coverage of the E-UTRA. The pre-configured frequency is the same as a frequency of a public safety carrier.

An upper layer may process to notify and monitor authorizations of the discovery message.

The content of the discovery message is transparent to an Access Stratum (AS), there is no distinction between sidelink discovery models in the AS, and there is no distinction between sidelink discovery types in the AS. However, the high layer may notify whether a discovery broadcast transmitted through the sidelink involves in public safety or non-public safety. A higher layer may also notify a discovery announcement and monitor whether a relaying-terminal discovery or other public-security discoveries is related.

The UE may participate in broadcasting and monitoring the discovery message in an Uu idle state and a Radio Resource Control (RRC) connection state according to configuration of the base station (eNB). The UE may broadcast and monitor the discovery message thereof under a half-duplex limitation.

The UE participating in broadcasting and monitoring the discovery message maintains a current Universal Time Coordinated (UTC) time. The UE participating in broadcasting transmits the discovery message, and the discovery message may be generated by a ProSe protocol, with the UTC time when the discovery message is transmitted taken into account. In a monitoring terminal, the ProSe protocol provides a message, which is verified together with the UTC time provided by a received ProSe Function.

In order to perform synchronization, the UE participating in broadcasting the discovery message may employ a Sidelink Broadcast Control Channel (SBCCH) and a synchronization signal as a synchronization source, which is transmitted from resource information of the synchronization signal provided in a System Information Block (SIB) 19.

There are three scope types for authorizations of the discovery message. An upper layer authorization provides an applicable-scope level of the UE. A maximum transmission power allowed for each range level is given in the SIB19. The UE uses an applicable-maximum-allowable transmission power corresponding to the authorized scope level thereof. An upper limit on the transmission power may be determined based on open-loop-power-controlling parameters.

In an LTE relay, only a layer-three relay is supported. Therefore, when the UE builds the discovery message, there will be no multiple modes for building the discovery message. That is, the message content of the discovery message is only generated in the PC5-S layer and directly transmitted.

In a NR relay, supported relaying types may be expanded. How to support more relaying types when the discovery message is built? There is no good solution yet in relevant technologies.

In order to solve the aforesaid problem, when building the discovery message, the technical solutions of some embodiments of the present disclosure may generate message content through at least one layer of a PC5-S layer and a PC5-Radio Resource Control (RRC) layer, and then generate a discovery message based on the message content generated in the at least one layer. Since some message content is generated in the PC5-RRC layer, and some message content is generated in the PC5-S layer, supported relaying types may be expanded through the message content of different layers, such as, the layer-two relay and the layer-three relay may be supported.

In some embodiments of the present disclosure, the layer-two relay refers to a relay mode that realizes a relay through an Access Stratum (AS) of the relaying terminal, and the layer-three relay refers to a relay mode that realizes a relay through a Non-Access Stratum (NAS) of the relaying terminal.

The technical solutions of the present disclosure will be introduced and explained by some embodiments.

Figure 2:
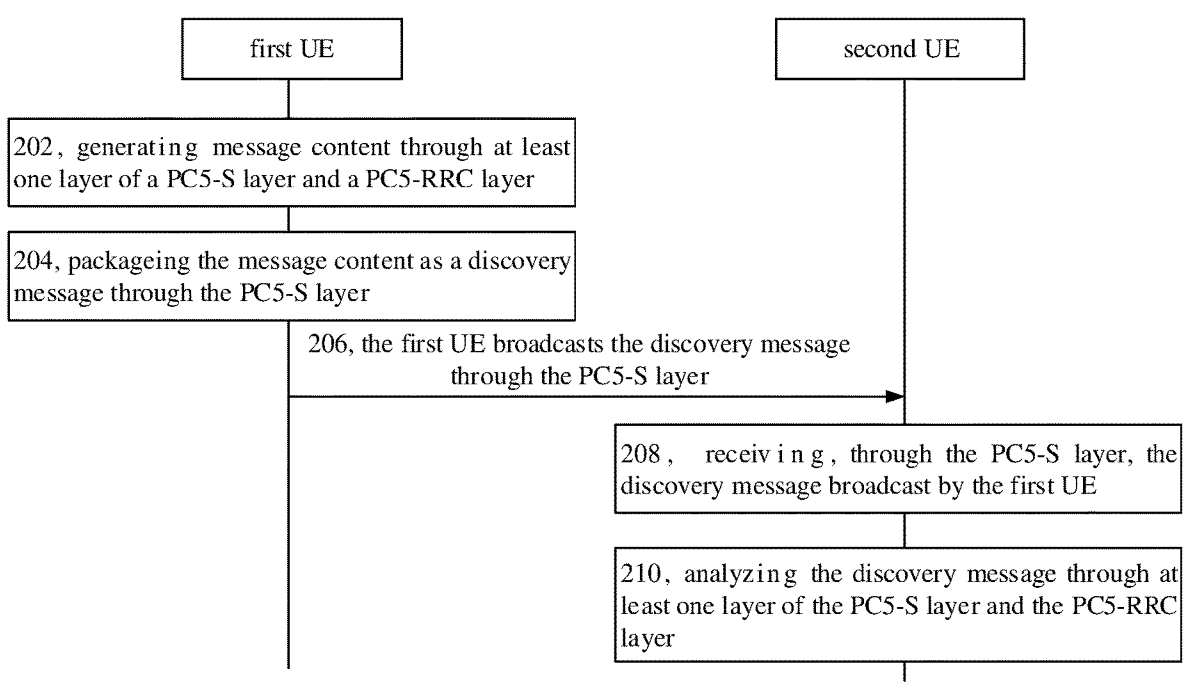
FIG. 2 is a flow chart of an interactive method for a discovery message provided by some embodiments of the present disclosure.

As shown in FIG. 2, FIG. 2 is a flow chart of an interactive method for a discovery message provided by some embodiments of the present disclosure. The method may be performed by a communication system shown in FIG. 1. The method may include the following operations (blocks 202~210).

At block 202, the first UE generates message content through at least one layer of a PC5-S layer and a PC5-RRC layer.

The first UE is a UE in the communication system, that may support a sidelink technology, and may perform information-direct-connection with other UEs through a PC5 interface.

In some embodiments of the present disclosure, the first UE may be a remote terminal, or may be a relaying terminal. Meanings of the remote terminal and the relaying terminal may be seen in the embodiments shown in FIG. 1, which will not be repeated herein.

The PC5-S layer and the PC5-RRC layer are two protocol layers different from each other and corresponding to the PC-5 interface. In the LTE relay, the message content of the discovery message is generated only by the PC5-S layer. In some embodiments of the present disclosure, the message content of the discovery message is generated by at least one layer of the PC5-S layer and the PC5-RRC layer.

In some embodiments of the present disclosure, the message content generated by at least one layer of the PC5-S layer and the PC5-RRC layer may support the layer-two relay and the layer-three relay which are two relaying types different from each other.

At block 204, the first UE packages the message content as a discovery message through the PC5-S layer.

In the PC5-S layer of the first UE, the first UE packages the message content or signaling containing the message content to generate the discovery message.

At block 206, the first UE broadcasts the discovery message through the PC5-S layer.

After the PC5-S layer generates the discovery message, the first UE broadcasts the discovery message through the PC5-S layer.

At block 208, the second UE receives, through the PC5-S layer, the discovery message broadcast by the first UE.

The second UE is a peer terminal of the first UE.

In some embodiments of the present disclosure, the second UE may be a remote terminal, or may be a relaying terminal. Meanings of the remote terminal and the relaying terminal may be seen in the embodiments shown in FIG. 1, which will not be repeated herein.

Since the PC5-S layer of the first UE broadcasts the discovery message, the second UE correspondingly receives, through the PC5-S layer, the discovery message transmitted by the first UE.

At block 210, the second UE analyzes the discovery message through at least one layer of the PC5-S layer and the PC5-RRC layer.

In some embodiments of the present disclosure, after receiving the discovery message, the second UE analyzes the message content of the discovery message through at least one layer of the PC5-S layer and the PC5-RRC layer, and then judges a relaying selection based on the message content. Herein, the relaying selection may be a relaying selection of a layer-two relaying type, or may also be a relaying selection of a layer-three relaying type.

For example, the first UE may be a remote terminal, the second UE may be a relaying terminal. At least one layer of the PC5-S layer and the PC5-RRC layer of the remote terminal generates the message content, packages, in the PC5-S layer, the message content as the discovery message, and transmits the discovery message to the relaying terminal. Based on the discovery message, the relaying terminal may determine whether to perform layer-two relay or layer-three relay for the remote terminal.

For example, the first UE may be a relaying terminal, the second UE is a remote terminal. At least one layer of the PC5-S layer and the PC5-RRC layer of the remote terminal generates the message content, packages, in the PC5-S layer, the message content as the discovery message, and transmits the discovery message to the remote terminal. Based on the discovery message, the remote terminal may determine whether to select the relaying terminal to perform layer-two relay or layer-three relay.

In summary, when building the discovery message, the technical solutions provided by some embodiments of the present disclosure may generate the message content through at least one layer of the PC5-S layer and the PC5-RRC layer, and then generate the discovery message by packaging the message content generated in the at least one layer. Since some message content is generated in the PC5-RRC layer, and some message content is generated in the PC5-S layer, the supported relaying types may be expanded through the message content of different layers, for example, layer-two relay and layer-three relay may be supported.

In some embodiments based on FIG. 2, the first UE may generate the message content of the discovery message through at least one layer of the PC5-S layer and the PC5-RRC layer in the following three possible implementation mode.

1) The first UE may generate the message content through the PC5-S layer.

2) The first UE may generate the message content through the PC5-RRC layer.

3) The first UE may generate the message content through the PC5-RRC layer and the PC5-S layer.

Next, the aforesaid three possible implementation modes will be described in an exemplary manner respectively.

1) The first UE may generate the message content through the PC5-S layer.

Figure 3:
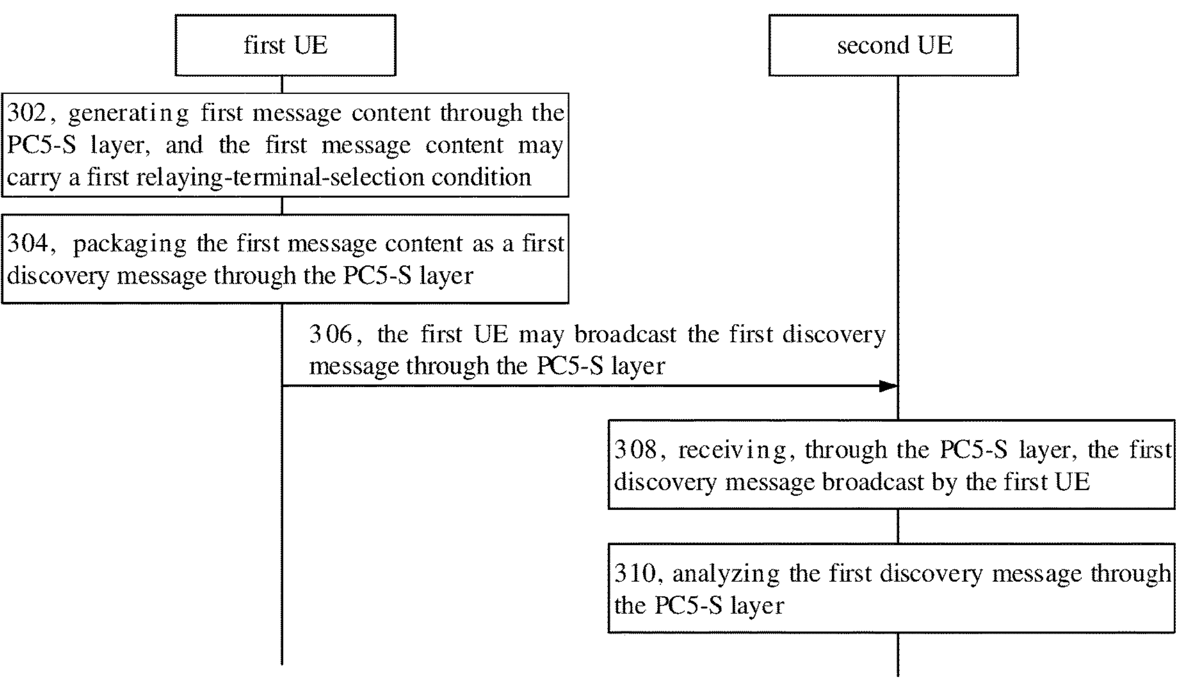
FIG. 3 is a flow chart of an interactive method for a discovery message provided by some embodiments of the present disclosure.

As shown in FIG. 3, FIG. 3 is a flow chart of an interactive method for a discovery message provided by some embodiments of the present disclosure. The method may be applied to the communication system shown in FIG. 1. The method may include the following operations (blocks 302~310).

At block 302, the first UE may generate first message content through the PC5-S layer, and the first message content may carry a first relaying-terminal-selection condition.

Herein, the first relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays. The relaying-terminal-selection condition is configured for a peer terminal of the first UB to judge a relaying selection.

In some embodiments, the first relaying-terminal-selection condition includes at least one of the following information.

A serving-cell identification.

The serving-cell identification is configured to indicate a current serving cell of the first UE.

A Public Land Mobile Network (PLMN) Identification.

The PLMN identification is configured to indicate a current PLMN of the first UE.

A Supported-Relaying-Type Indication.

The supporting-relaying-type identification is configured to indicate relaying types supported by the first UE, such as: supporting layer-two relay, supporting layer-three relay, supporting layer-two relay and layer-three relay.

A Load Condition Indication.

The load condition indication is configured to indicate a current load condition of the first UE. In some embodiments, if the first UE is the relaying terminal, the first relaying-terminal-selection condition may include the load condition indication.

A non-serving-cell identification.

The non-serving-cell identification is configured to indicate a current non-serving cell of the first UE.

An Inter-PLMN Identification.

The inter-PLMN identification is configured to indicate a current inter-PLMN of the first UE.

At block 304, the first UE may package the first message content as a first discovery message through the PC5-S layer.

In the PC5-S layer of the first UE, the first UE may package the first message content and directly generate the first discovery message.

At block 306, the first UE may broadcast the first discovery message through the PC5-S layer.

After the PC5-S layer generates the first discovery message, the first UE may broadcast the first discovery message through the PC5-S layer.

At block 308, the second UE may receive, through the PC5-S layer, the first discovery message broadcast by the first UE.

At block 310, the second UE may analyze the first discovery message through the PC5-S layer.

After receiving the discovery message, the second UE may directly analyze the message content of the first discovery message through PC5-S layer, and then judges a relaying selection based on the first message content obtained by analyzing. Herein, the relaying selection may be a relaying selection of a layer-two relaying type, may also be a relaying selection of a layer-three relaying type.

In summary, the technical solutions provided by some embodiments may generate the first message content through the PC5-S layer, and then generate the first discovery message by packaging based on the first message content. The first relaying-terminal-selection condition carried by the first message content may be configured to support at least one relaying type of the layer-two relay and the layer-three relay.

2) The first UE may generate the message content through the PC5-RRC layer.

Figure 4:
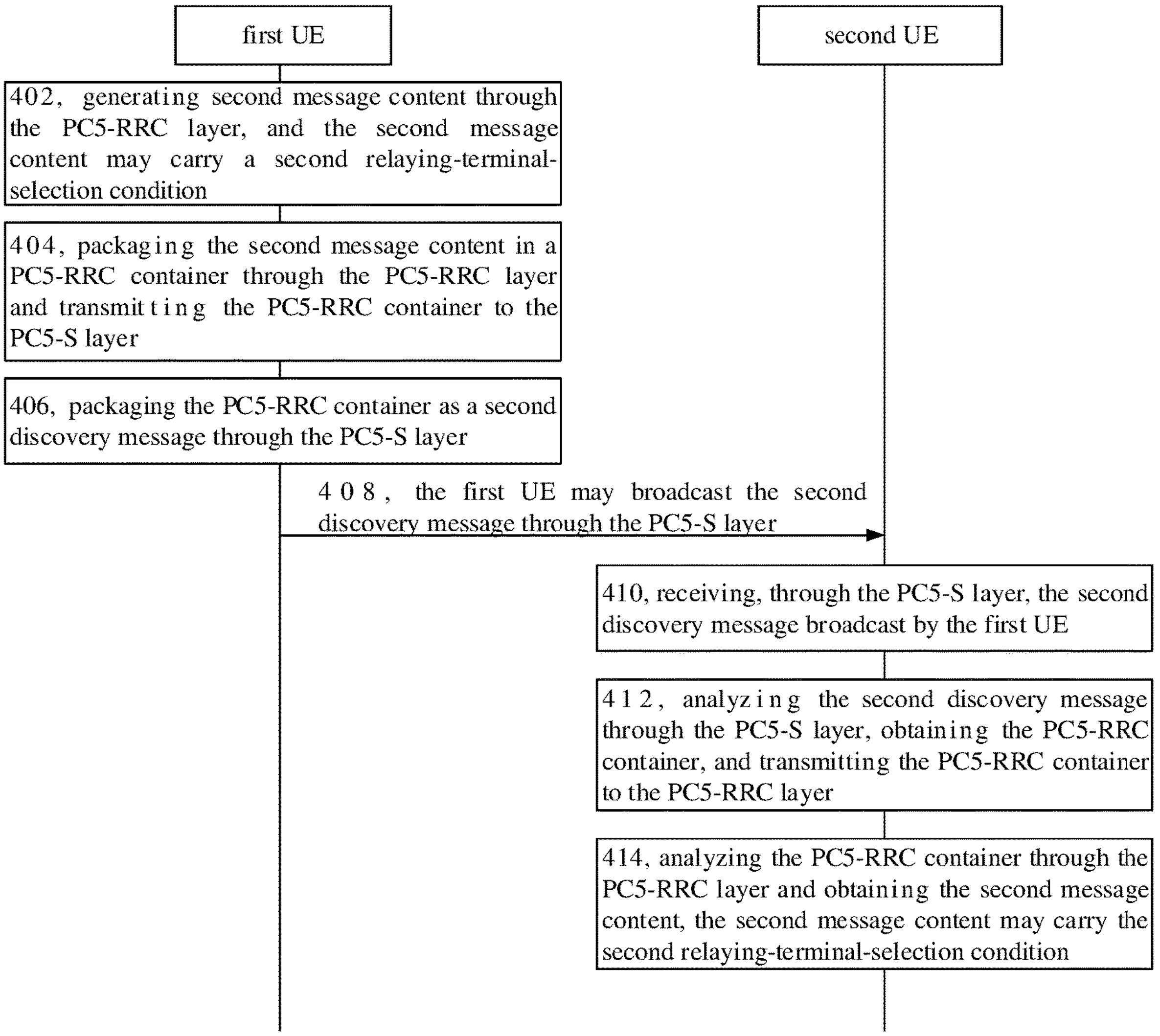
FIG. 4 is a flow chart of an interactive method for a discovery message provided by some embodiments of the present disclosure.

As shown in FIG. 4, FIG. 4 is a flow chart of an interactive method for a discovery message provided by some embodiments of the present disclosure. The method may be applied to the communication system shown in FIG. 1. The method may include the following operation (blocks 402~414).

At block 402, the first UE may generate second message content through the PC5-RRC layer, and the second message content may carry a second relaying-terminal-selection condition.

Herein, the second relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays. The relaying-terminal-selection condition is configured for a peer terminal of the first UE to judge a relaying selection.

In some embodiments, the second relaying-terminal-selection condition includes at least one of the following information.

A serving-cell Identification.

The serving-cell identification is configured to indicate a current service cell of the first UE.

A Public Land Mobile Network (PLMN) Identification.

The PLMN identification is configured to indicate a current PLMN of the first UE.

A Supported-Relaying-Type Indication.

The supporting-relaying-type identification is configured to indicate relaying types supported by the first UE, such as: supporting layer-two relay, supporting layer-three relay, supporting layer-two relay and layer-three relay.

A Load Condition Indication.

The load condition indication is configured to indicate a current load condition of the first UE. In some embodiments, if the first UE is the relaying terminal, the first relaying-terminal-selection condition may include the load condition indication.

A non-serving-cell Identification.

The non-serving-cell identification is configured to indicate a current non-service cell of the first UE.

An Inter-PLMN Identification.

The inter-PLMN identification is configured to indicate a current inter-PLMN of the first UE.

At block 404, the first UE may package the second message content in a PC5-RRC container through the PC5-RRC layer and transmit the PC5-RRC container to the PC5-S layer.

In some embodiments, the first UE may package, in the PC5-RRC layer, the second message content in the PC5-RRC container and cut the PC5-RRC container into at least two container fragments. The PC5-RRC layer may transmit the at least two container fragments to the PC5-S layer.

In some embodiments of the present disclosure, information transmission between the protocol layers may be understood as an information delivery. For example, that the PC5-RRC layer transmits the PC5-RRC container to the PC5-S layer may be understood as that the PC5-RRC layer delivers the PC5-RRC container to the PC5-S layer.

That is, if the PC5-RRC container generated through the PC5-RRC layer is too large to be packaged in a PC5-S message, the first UE is required to cut the PC5-RRC container into a plurality of container fragments and transmit the plurality of container fragments to the PC5-S layer.

In some embodiments, the first UE may number, in the PC5-RRC layer, the at least two container fragments. The PC5-RRC layer may transmit the at least two container fragments carrying corresponding numbers to the PC5-S layer.

That is to say, the PC5-RRC layer may number the container fragments, transmit the container fragments and corresponding numbers to the PC5-S layer, and package, in the PC5-S layer, the container fragments as a plurality of discovery messages.

At block 406, the first UE may package the PC5-RRC container as a second discovery message through the PC5-S layer.

In some embodiments, if the PC5-RRC container includes at least two container fragments, the PC5-S layer of the first UE may package each container fragment as a second discovery message after receiving the at least two container fragments.

At block 408, the first UE may broadcast the second discovery message through the PC5-S layer.

After the PC5-S layer generates the second discovery message, the first UE may broadcast the second discovery message through the PC5-S layer.

At block 410, the second UE may receive, through the PC5-S layer, the second discovery message broadcast by the first UE.

At block 412, the second UE may analyze the second discovery message through the PC5-S layer, obtain the PC5-RRC container, and transmit the PC5-RRC container to the PC5-RRC layer.

In some embodiments, the PC5-RRC container may include at least two container fragments. The PC5-S layer of the second UE may assemble the at least two container fragments into the PC5-RRC container and transmit the PC5-RRC container to the PC5-RRC layer.

That is, the PC5-RRC container received by the second UE may be in a form of at least two container fragments. After assembling the at least two container fragments into a complete PC5-RRC container, the PC5-S layer of the second UE may transmit the PC5-RRC container to the PC5-RRC layer.

In some embodiments, each container fragment corresponds to a number. The PC5-S layer of the second UE may assemble at least two container fragments into the PC5-RRC container based on the numbers corresponding to the at least two container fragments respectively.

That is, the second UE may analyze out, in the PC5-S layer, the PC5-RRC container fragments and the numbers corresponding to the container fragments carried by the second discovery message, thus assembling the at least two container fragments into a complete PC5-RRC container.

In some embodiments, if the second UE finds a container fragment of which the corresponding number is missing when assembling the PC5-RRC container, the second UE may feed back to the first UE through a Physical Sidelink Feedback Channel (PSFCH) and request a retransmission.

At block S11, the second UE may transmit retransmission-indicating information to the first UE through a PSFCH, and the retransmission-indicating information may carry a number corresponding to at least one of the container fragments.

Herein, the second UE is a peer terminal of the first UE.

At block S12, the first UE may receive, through the PSFCH, the retransmission-indicating information fed back by the second UE, and the retransmission-indicating information may carry the number corresponding to at least one of the container fragments.

At block S13, the first UE may transmit, through the PC5-S layer, a fourth discovery message in which the at least one of the container fragments corresponding to the number is packaged to the second UE.

At block S14, the second UE may receive, through the PC5-S layer, the fourth discovery message in which the at least one of the container fragments corresponding to the number is packaged and which is transmitted by the first UE.

At block 414, the second UE may analyze the PC5-RRC container through the PC5-RRC layer and obtain the second message content, the second message content may carry the second relaying-terminal-selection condition.

After receiving the second discovery message, the second UE may analyze out the PC5-RRC container through the PC5-S layer, transmit the container to the PC5-RRC layer, and continue to analyze. The second UE may analyze out, in the PC5-RRC layer, the second message content carried by the second discovery message and judge a relaying selection by using the information. Herein, the relaying selection may be a relaying selection of a layer-two relaying type, may also be a relaying selection of a layer-three relaying type.

In summary, the technical solutions provided by some embodiments may generate the second message content through the PC5-RRC layer, package the second message content in the PC5-RRC container, transmit the PC5-RRC container to the PC5-S layer, and then generate the second discovery message by packaging based on the PC5-RRC container. The second relaying-terminal-selection condition carried by the second message content may be configured to support at least one relaying type of the layer-two relay and the layer-three relay.

In the technical solutions provided by some embodiments, if the PC5-RRC container generated through the PC5-RRC layer is too large to be packaged into a PC5-S message, the first UE may cut the PC5-RRC container into a plurality of container fragments and transmit the plurality of container fragments to the PC5-S layer. In this way, after receiving the at least two container fragments, the PC5-S layer of the first UE may package each container fragment as a second discovery message, and the transmission of the PC5-RRC container in a large size may be ensured.

The technical solutions provided by some embodiments may number each container fragment, in this way, the container fragments may be assembled into a complete PC5-RRC container based on the numbers, and the reliability of transmitting the PC5-RRC container after cutting may be ensured.

3) The first UE may generate the message content through the PC5-RRC layer and the PC5-S layer.

Figure 5:
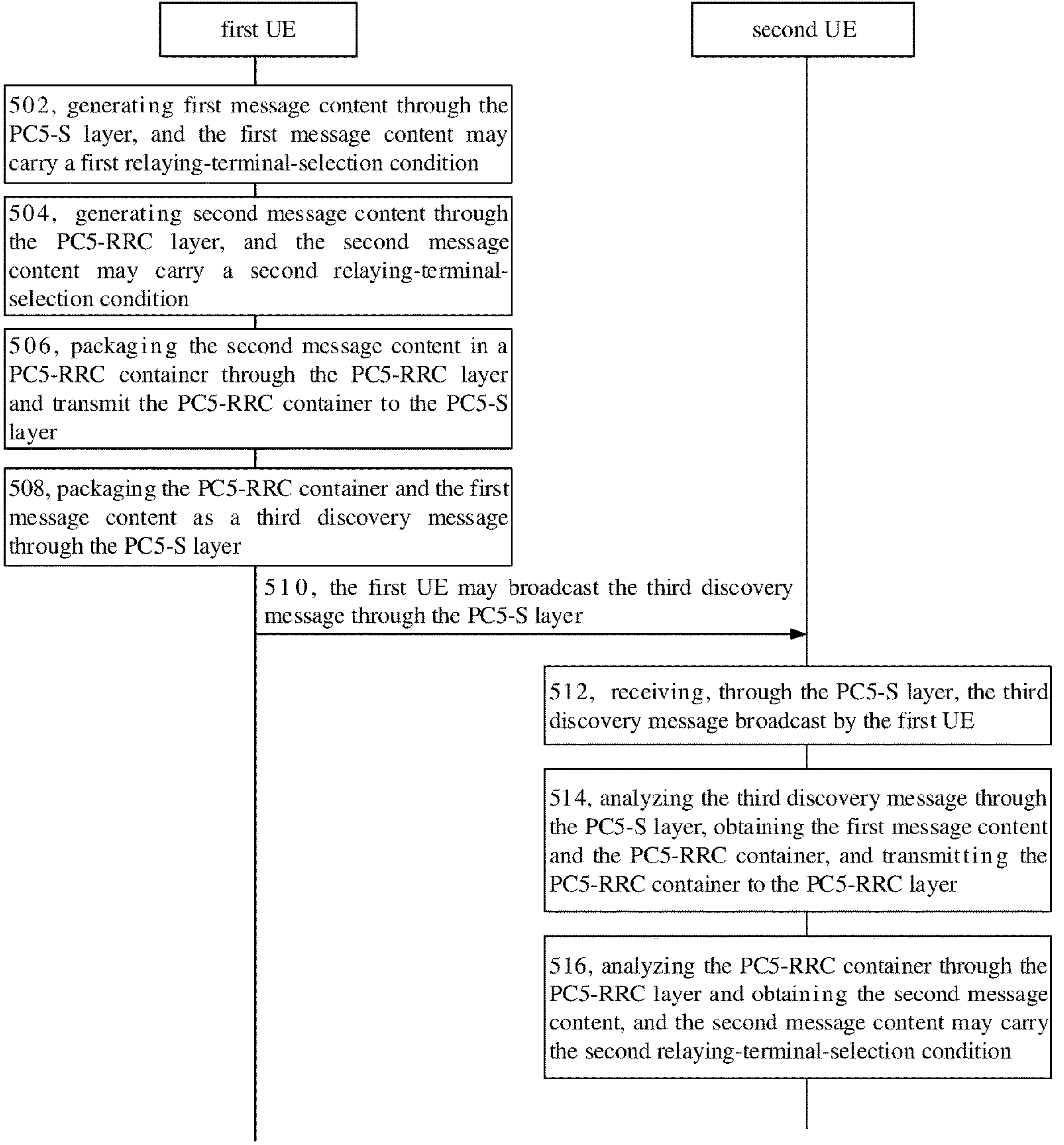
FIG. 5 is a flow chart of an interactive method for a discovery message provided by some embodiments of the present disclosure.

As shown in FIG. 5, FIG. 5 is a flow chart of an interactive method for a discovery message provided by some embodiments of the present disclosure. The method may be applied to the communication system shown in FIG. 1. The method may include the following operation (blocks 502~516).

At block 502, the first UE may generate first message content through the PC5-S layer, and the first message content may carry a first relaying-terminal-selection condition.

Herein, the first relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays. The relaying-terminal-selection condition is configured for a peer terminal of the first UE to judge a relaying selection.

In some embodiments, the first relaying-terminal-selection condition may include at least one of: a serving-cell identification, a Public Land Mobile Network (PLMN) identification, a supported-relaying-type indication, a load condition indication, a non-serving-cell identification, or an inter-PLMN identification serving-cell identification. As shown in the aforesaid embodiments for details, which will not be repeated herein At block 504, the first UE may generate second message content through the PC5-RRC layer, and the second message content may carry a second relaying-terminal-selection condition.

Herein, the second relaying-terminal-selection condition is another relaying-terminal-selection condition commonly used for layer-two relays and layer-three relays, or another relaying-terminal-selection condition specially for layer-two relays, or another relaying-terminal-selection condition specially for layer-three relays. The relaying-terminal-selection condition is configured for a peer terminal of the first UE to judge a relaying selection.

In some embodiments, the second relaying-terminal-selection condition may include at least one of: a serving-cell identification, a Public Land Mobile Network (PLMN) identification, a supported-relaying-type indication, a load condition indication, a non-serving-cell identification, or an inter-PLMN identification serving-cell identification. As shown in the aforesaid embodiments for details, which will not be repeated herein.

In some embodiments of the present disclosure, the first relaying-terminal-selection condition carried by the first message content generated by the PC5-S layer and the second relaying-terminal-selection condition carried by the second message content generated by the PC5-RRC layer may include the same information content or may include different information content.

In some embodiments, the first relaying-terminal-selection condition is a relaying-terminal-selection condition commonly for layer-two relays and layer-three relays and may include at least one of: a serving-cell identification, a Public Land Mobile Network (PLMN) identification, a supported-relaying-type indication, or a load condition indication. The second relaying-terminal-selection condition is a relaying-terminal-selection condition specially used for layer-two relays and may include at least one of: a non-serving-cell identification or an inter-PLMN identification.

In some embodiments of the present disclosure, the implementation sequence of the block 502 and the block 504 is not limited. The block 502 may be implemented firstly, and then the block 504 may be implemented; or the block 504 may be implemented firstly, and then the block 502 may be implemented; or the block 502 and the block 504 may be implemented simultaneously.

At block 506, the first UE may package the second message content in a PC5-RRC container through the PC5-RRC layer and transmit the PC5-RRC container to the PC5-S layer.

In some embodiments, the first UE may package, in the PC5-RRC layer, the second message content in the PC5-RRC container and cut the PC5-RRC container into at least two container fragments. The PC5-RRC layer may transmit the at least two container fragments to the PC5-S layer.

That is, if the PC5-RRC container generated through the PC5-RRC layer is too large to be packaged in a PC5-S message, the first UE is required to cut the PC5-RRC container into a plurality of container fragments and transmit the plurality of container fragments to the PC5-S layer.

In some embodiments, the first UE may number, in the PC5-RRC layer, the at least two container fragments. The PC5-RRC layer may transmit the at least two container fragments carrying corresponding numbers to the PC5-S layer.

That is to say, the PC5-RRC layer may number the container fragments and transmit the container fragments and corresponding numbers to the PC5-S layer.

At block 508, the first UE may package the PC5-RRC container and the first message content as a third discovery message through the PC5-S layer.

In some embodiments, if the PC5-RRC container includes at least two container fragments, after receiving the at least two container fragments, the PC5-S layer of the first UE may package each container fragment as a second discovery message.

In some embodiments, the first message content and the second message content correspond to different layer-two identifications.

That is, if the message is found to carry the first message content generated by the PC5-S layer and the second message content packaged in the PC5-RRC container, the first UE may mark the first message content and the second message content with different layer-two identifications.

At block 510, the first UE may broadcast the third discovery message through the PC5-S layer.

After the PC5-S layer generates the third discovery message, the first UE may broadcast the third discovery message through the PC5-S layer.

At block 512, the second UE may receive, through the PC5-S layer, the third discovery message broadcast by the first UE.

At block 514, the second UE may analyze the third discovery message through the PC5-S layer, obtain the first message content and the PC5-RRC container, and transmit the PC5-RRC container to the PC5-RRC layer.

In some embodiments, the PC5-RRC container includes at least two container fragments. The PC5-S layer of the second UE may assemble the at least two container fragments into the PC5-RRC container and transmit the PC5-RRC container to the PC5-RRC layer.

That is, the PC5-RRC container may be in a form of a plurality of two container fragments. After assembling the at least two container fragments into a complete PC5-RRC container, the PC5-S layer of the second UE may transmit the PC5-RRC container to the PC5-RRC layer.

In some embodiments, each container fragment corresponds to a number. The second UE may assemble the at least two container fragments as the PC5-RRC container through the PC5-S layer based on the numbers corresponding to the at least two container fragments.

That is, the second UE may analyze out, in the PC5-S layer, the PC5-RRC container fragments and the numbers corresponding to the container fragments carried by the discovery message, thus assembling the at least two container fragments into a complete PC5-RRC container.

In some embodiments, if the second UE finds a container fragment of which the corresponding number is missing when assembling the PC5-RRC container, the second UE may feed back to the first UE through the PSFCH and request a retransmission.

At block S21, the second UE may transmit a retransmission-indicating information to the first UE through a PSFCH, and the retransmission-indicating information may carry a number corresponding to at least one of the container fragments.

Herein, the second UE is a peer terminal of the first UE.

At block S22, the first UE may receive, through the PSFCH, the retransmission-indicating information fed back by the second UE, and the retransmission-indicating information may carry the number corresponding to the at least one of the container fragments.

At block S23, the first UE may transmit, through the PC5-S layer, a fourth discovery message in which the at least one of the container fragments corresponding to the number is packaged, to the second UE.

At block S24, the second UE may receive, through the PC5-S layer, the fourth discovery message in which the at least one of the container fragments corresponding to the number is packaged and which is transmitted by the first UE.

At block 516, the second UE may analyze the PC5-RRC container through the PC5-RRC layer and obtain the second message content, and the second message content may carry the second relaying-terminal-selection condition.

After receiving the third discovery message, the second UE may analyze out the first message content and the PC5-RRC container through the PC5-S layer, transmit the container to the PC5-RRC layer, and continue to analyze. The second UE may analyze out, in the PC5-RRC layer, the second message content carried by the third discovery message and judge a relaying selection through the first message content and the second message content. Herein, the relaying selection may be a relaying selection of a layer-two relaying type, may also be a relaying selection of a layer-three relaying type.

In summary, the technical solutions provided some embodiments may generate the first message content through the PC5-S layer, generate the second message content through the PC5-RRC layer, package the second message content in the PC5-RRC container, transmit the PC5-RRC container to the PC5-S layer, and then generate, in the PC5-S layer, the third discovery message by packaging based on the PC5-RRC container and the first message content. The first relaying-terminal-selection condition carried by the first message content in the third discovery message and the second relaying-terminal-selection condition carried by the second message content in the third discovery message may be configured to support at least one relaying type of the layer-two relay and the layer-three relay.

In the technical solutions provided by some embodiments, if the PC5-RRC container generated through the PC5-RRC layer is too large to be packaged into a PC5-S message, the first UE may cut the PC5-RRC container into a plurality of container fragments and transmit the plurality of container fragments to the PC5-S layer. In this way, after receiving the at least two container fragments, the PC5-S layer of the first UE may package each container fragment as a second discovery message, and the transmission of the PC5-RRC container in a large size may be ensured.

The technical solutions provided by some embodiments may number each container fragment, in this way, the container fragments may be assembled into a complete PC5-RRC container based on the numbers, and the reliability of transmitting the PC5-RRC container after cutting may be ensured.

In some embodiments, the discovery message carrying the PC5-RRC container and the discovery message not carrying the PC5-RRC container may correspond to different Sidelink-Signaling Resource Bearers (SL-SRBs). In some embodiments, the discovery message packaged from the message content directly generated by the PC5-S layer and the discovery message packaged from the message content directly generated by the PC5-RRC layer may correspond to different SL-SRBs.

For example, the discovery message carrying the PC5-RRC container may correspond to SL-SRB #1, and the discovery message not carrying the PC5-RRC container may correspond to SL-SRB #2. The resources corresponding to SL-SRB #1 are greater than the resources corresponding to SL-SRB #2.

For example, the discovery message packaged from the message content directly generated by the PC5-RRC layer may correspond to a SL-SRB #1, and the discovery message packaged from the message content directly generated by the PC5-S layer may correspond to a SL-SRB #2. The resources corresponding to the SL-SRB #1 are greater than the resources corresponding to the SL-SRB #2.

In some embodiments, since the discovery message carrying the PC5-RRC container or the discovery message packaged from the message content directly generated by the PC5-RRC layer has a large size, different SL-SRBs may be configured for such types of discovery messages and other types of discovery messages, which is conducive for the first UE to make reasonable resource selection for discovery messages, and resource consumption may be reduced.

In some embodiments, the discovery message carrying the PC5-RRC container and the discovery message not carrying the PC5-RRC container may correspond to different transmitting-resource pools. In some embodiments, the discovery message packaged from the message content directly generated by the PC5-S layer and the discovery message packaged from the message content directly generated by the PC5-RRC layer may correspond to different transmitting-resource pools.

For example, the discovery message carrying the PC5-RRC container may correspond to a transmitting-resource pool 1, and the discovery message without the PC5-RRC container may corresponds to a transmitting-resource pool 2. The transmitting resources in the transmitting-resource pool 1 are greater than the transmitting resources in the transmitting-resource pool 2.

For example, the discovery message packaged from the message content directly generated by the PC5-RRC layer corresponds to the transmitting-resource pool 1, and the discovery message packaged from the message content directly generated by the PC5-S layer corresponds to the transmitting-resource pool 2. The transmitting resources in the transmitting-resource pool 1 are greater than the transmitting resources in the transmitting-resource pool 2.

In some embodiments, since the discovery message carrying the PC5-RRC container or the discovery message packaged from the message content directly generated by the PC5-RRC layer has a large size, a large transmitting-resource pool may be configured for such types of discovery messages, and a small transmitting-resource pool may be configured for other types of discovery messages, which is conducive to reducing the monitoring energy consumption of the peer terminal of the first UE monitoring the transmitting-resource pool, and energy may be saved.

It should be noted that, in the aforesaid method embodiments, the technical solutions of the present disclosure are mainly introduced and described from the perspective of interaction between the first UE and the second UE. The aforesaid operations executed by the first UE may be independently implemented as the generation method for a discovery message of the first UE side. The aforesaid operations executed by the second UE may be independently implemented as the analysis method of the discovery message of the second UE side.

The following is some apparatus embodiments of the present disclosure, which may be configured to execute method embodiments of the present disclosure. Details not disclosed in the apparatus embodiments of the present disclosure may be referred to the method embodiments of the present disclosure.

Figure 6:
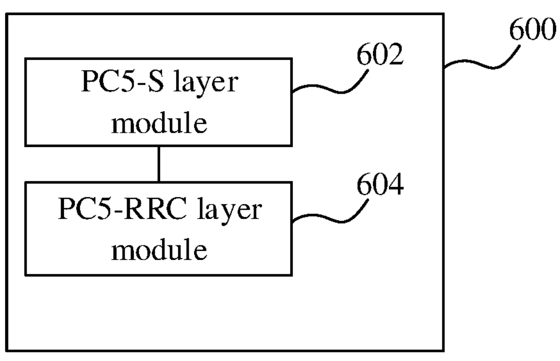
FIG. 6 is a block diagram of a generation apparatus for a discovery message provided by some embodiments of the present disclosure.

As shown in FIG. 6, FIG. 6 is a block diagram of a generation apparatus for a discovery message provided by some embodiments of the present disclosure. The apparatus has functions of realizing the aforesaid method embodiments of the first UE side, and the functions may be implemented by a hardware or may be implemented by executing a corresponding software by a hardware. The apparatus may be the first UE described above or may be arranged in the first UE. As shown in FIG. 6, the apparatus 600 may include a PC5-S layer module 602 and a PC5-RRC layer module 604. At least one module of the PC5-S layer module 602 and the PC5-RRC layer module 604 is configured to generate message content. The PC5-S layer module 602 is configured to package the message content as a discovery message.

In some embodiments, the PC5-S layer module 602 is configured to generate first message content, and the first message content carries a first relaying-terminal-selection condition; and the PC5-S layer module 602 is configured to package the first message content as a first discovery message; wherein the first relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays, the relaying-terminal-selection condition is configured for a peer terminal of a first User Equipment (UE) to judge a relaying selection.

In some embodiments, the PC5-RRC layer module 604 is configured to generate second message content, the second message content carries a second relaying-terminal-selection condition; the PC5-RRC layer module 604 is configured to package the second message content in a PC5-RRC container and transmit the PC5-RRC container to the PC5-S layer module 602; the PC5-S layer module 602 is configured to package the PC5-RRC container as a second discovery message; wherein the second relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays, the relaying-terminal-selection condition is configured for a peer terminal of a first UE to judge a relaying selection.

In some embodiments, the PC5-S layer module 602 is configured to generate first message content, and the first message content carries a first relaying-terminal-selection condition; the PC5-RRC layer module 604 is configured to generate second message content, and the second message content carries a second relaying-terminal-selection condition; the PC5-RRC layer module 604 is configured to package the second message content in a PC5-RRC container and transmit the PC5-RRC container to the PC5-S layer module 602; and the PC5-S layer module 602 is configured to package the PC5-RRC container and the first message content as a third discovery message; and wherein the first relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays; the second relaying-terminal-selection condition is another relaying-terminal-selection condition commonly for layer-two relays and layer-three relays, or another relaying-terminal-selection condition specially used for layer-two relays, or another relaying-terminal-selection condition specially used for layer-three relays; the relaying-terminal-selection condition is configured for a peer terminal of a first UE to judge a relaying selection.

In some embodiments, the first message content and the second message content correspond to different layer-two identifiers.

In some embodiments, the PC5-RRC layer module 604 is configured to package the second message content in the PC5-RRC container and cut the PC5-RRC container into at least two container fragments; and the PC5-RRC layer module 604 is configured to transmit the container fragments to the PC5-S layer module 602.

In some embodiments, the PC5-RRC layer module 604 is configured to number the container fragments; and the PC5-RRC layer module 604 is configured to transmit the container fragments carrying corresponding numbers to the PC5-S layer module 602.

In some embodiments, the apparatus further includes a Physical Sidelink Feedback Channel (PSFCH) module; the PSFCH module is configured to receive retransmission-indicating information fed back by a second UE, and the retransmission-indicating information carries a number corresponding to at least one of the container fragments; the PC5-S layer module 602 is configured to transmit a fourth discovery message to the second UE, and the at least one of the container fragments corresponding to the number is packaged in the fourth discovery message; and wherein the second UE is a peer terminal of the first UE.

In some embodiments, the first relaying-terminal-selection condition includes at least one of: a serving-cell identification; a Public Land Mobile Network (PLMN) identification; a supported-relaying-type indication; a load condition indication; a non-serving-cell identification; or an inter-PLMN identification.

In some embodiments, the second relaying-terminal-selection condition includes at least one of a serving-cell identification; a PLMN identification; a supported-relaying-type indication; a load condition indication; a non-serving-cell identification; or an inter-PLMN identification.

In some embodiments, the PC5-S layer module 602 is configured to broadcast the discovery message.

In some embodiments, the discovery message carrying a PC5-RRC container and the discovery message not carrying a PC5-RRC container correspond to different Sidelink-Single Radio Bearers (SL-SRBs); or the discovery message packaged from the message content directly generated by the PC5-S layer module 602 and the discovery message packaged from the message content directly generated by the PC5-RRC layer module 604 correspond to different SL-SRBs.

In some embodiments, the discovery message carrying a PC5-RRC container and the discovery message not carrying a PC5-RRC container correspond to different transmitting-resource pools; or the discovery message packaged from the message content directly generated by the PC5-S layer module 602 and the discovery message packaged from the message content directly generated by the PC5-RRC layer module 604 correspond to different transmitting-resource pools.

Figure 7:
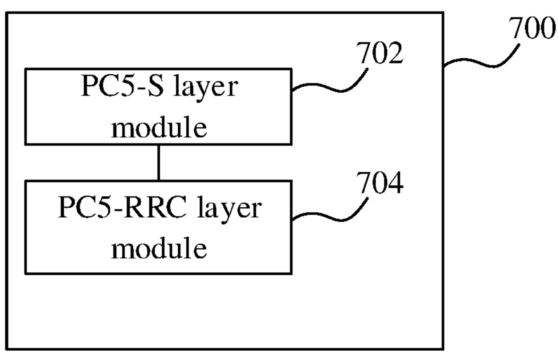
FIG. 7 is a block diagram of an analysis apparatus for a discovery message provided by some embodiments of the present disclosure.

As shown in FIG. 7, FIG. 7 is a block diagram of an analysis apparatus for a discovery message provided by some embodiments of the present disclosure. The apparatus has functions of realizing the aforesaid method embodiments of the second UE side, and the functions may be implemented by a hardware or may be implemented by executing a corresponding software by a hardware. The apparatus may be the second UE described above or may be arranged in the second UE. As shown in FIG. 7, the apparatus 700 may include a PC5-S layer module 702 and a PC5-RRC layer module 704. The PC5-S layer module 702 is configured to receive the discovery message broadcast by a first User Equipment (UE); and at least one module of the PC5-S layer module 702 and the PC5-RRC layer module 704 is configured to analyze the discovery message.

In some embodiments, the PC5-S layer module 702 is configured to analyze a first discovery message and obtain first message content, wherein the first message content carries a first relaying-terminal-selection condition; and wherein the first relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays, the relaying-terminal-selection condition is configured for a peer terminal of a second UE to judge a relaying selection.

In some embodiments, the PC5-S layer module 702 is configured to analyze a second discovery message, obtain a PC5-RRC container, and transmit the PC5-RRC container to the PC5-RRC layer module 704; the PC5-RRC layer module 704 is configured to analyze the PC5-RRC container and obtain the second message content, wherein the second message content carries a second relaying-terminal-selection condition; wherein the second relaying-terminal-selection condition is a relaying-terminal-selection condition commonly used for layer-two relays and layer-three relays, or a relaying-terminal-selection condition specially used for layer-two relays, or a relaying-terminal-selection condition specially used for layer-three relays, the relaying-terminal-selection condition is configured for a peer terminal of a second UE to judge a relaying selection.

In some embodiments, the PC5-S layer module 702 is configured to analyze a third discovery message, obtain first message content and a PC5-RRC container, and transmit the PC5-RRC container to the PC5-RRC layer module 704, wherein the first message content carries a first relaying-terminal-selection condition; the PC5-RRC layer module 704 is configured to analyze the PC5-RRC container and obtain second message content, wherein the second message content carries a second relaying-terminal-selection condition; and wherein the first relaying-terminal-selection condition is a relaying-terminal-selection condition commonly used for layer-two relays and the layer-three relays, or a relaying-terminal-selection condition specially used for layer-two relays, or a relaying-terminal-selection condition specially used for layer-three relays; the second relaying-terminal-selection condition is another relaying-terminal-selection condition commonly used for layer-two relays and the layer-three relays, or another relaying-terminal-selection condition specially used for layer-two relays, or another relaying-terminal-selection condition specially used for layer-three relays; the relaying-terminal-selection condition is configured for a peer terminal of a second UE to judge a relaying selection.

In some embodiments, the first message content and the second message content correspond to different layer-two identifiers.

In some embodiments, the PC5-RRC container includes at least two container fragments; the PC5-S layer module 702 is configured to assemble the container fragments into the PC5-RRC container and transmit the PC5-RRC container to the PC5-RRC layer module 704.

In some embodiments, each of the container fragments correspond to a number; and the PC5-S layer module 702 is configured to assemble the container fragments into the PC5-RRC container based on the number corresponding to each of the container fragments.

In some embodiments, the apparatus further includes a Physical Sidelink Feedback Channel (PSFCH) module; the PSFCH module is configured to transmit retransmission-indicating information to the first UE, and the retransmission-indicating information carries the number corresponding to at least one of the container fragments; the PC5-S layer module 702 is configured to receive the fourth discovery message transmitted by the first UE, and the at least one of the container fragments corresponding to the number is packaged in the fourth discovery message.

In some embodiments, the first relaying-terminal-selection condition includes at least one of: a service-cell identification; a Public Land Mobile Network (PLMN) identification; a supported-relaying-type indication; a load condition indication; a non-service-cell identification; or an inter-PLMN identification.

In some embodiments, the second relaying-terminal-selection condition includes at least one of a service-cell identification; a PLMN identification; a supported-relaying-type indication; a load condition indication; a non-service-cell identification; or an inter-PLMN identification.

In some embodiments, the discovery message carrying a PC5-RRC container and the discovery message not carrying a PC5-RRC container correspond to different Sidelink-Single Radio Bearers (SL-SRBs); or the discovery message packaged from the message content directly generated by the PC5-S layer module 702 and the discovery message packaged from the message content directly generated by the PC5-RRC layer module 704 correspond to different SL-SRBs.

In some embodiments, the discovery message carrying a PC5-RRC container and the discovery message not carrying a PC5-RRC container correspond to different transmitting-resource pools; or the discovery message packaged from the message content directly generated by the PC5-S layer module 702 and the discovery message packaged from the message content directly generated by the PC5-RRC layer module 704 correspond to different transmitting-resource pools.

It should be noted that, when the apparatus provided by the aforesaid embodiments implement its functions, the division of the aforesaid functional modules is used as an example for illustration only. In actual applications, the aforesaid functions may be allocated to different functional modules according to actual needs. That is, the content structure of the apparatus may be divided into different functional modules to complete all or part of the functions described above.

Regarding the apparatus in the aforesaid embodiments, the operation executed by each module has been described in detail in the corresponding method embodiments, which will not be described in detail herein.

Figure 8:
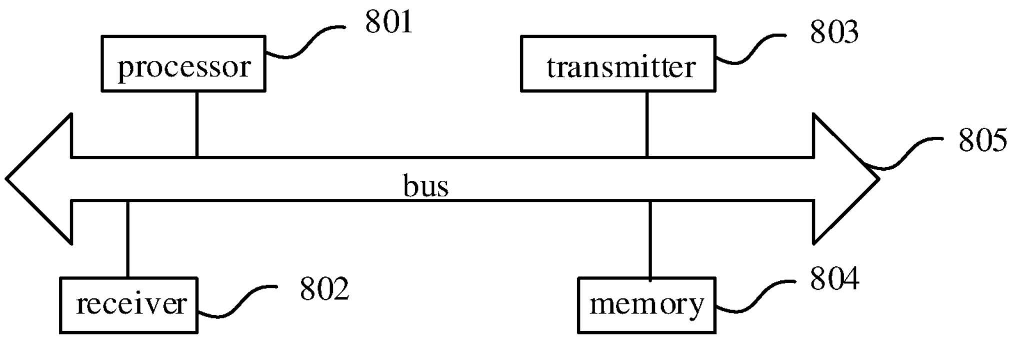
FIG. 8 is a schematic structural view of a UE provided by some embodiments of the present disclosure.

As shown in FIG. 8, FIG. 8 is a schematic structural view of a UE provided by some embodiments of the present disclosure. The UE may include a processor 801, a receiver 802, a transmitter 803, a memory 804, and a bus 805.

The processor 801 includes one or more processing cores. The processor 801 execute various functional applications and information processing by running software programs and modules.

The receiver 802 and the transmitter 803 may be implemented as a transceiver 806, which may be a communication chip.

The memory 804 is connected to the processor 801 through the bus 805.

The memory 804 may be configured to store a computer program, and the processor 801 may be configured to execute the computer program to realize the operations execute by the UE in the aforesaid method embodiments.

In addition, the memory 804 may be implemented by any type of volatile or non-volatile storage device or any combination thereof. The volatile or non-volatile storage device may include, but not limited to, Random-Access Memory (RAM), Read-Only Memory (ROM), Erasable Programmable Read-Only Memory (EPROM), Electrically Erasable Programmable Read-Only Memory (EEPROM), flash memory or any other solid-state storage technologies, Compact Disc Read-Only Memory (CD-ROM), Digital Video Disc (DVD) or any other optical storages, tape cartridge, magnetic tape, magnetic disk storage, or any other magnetic storage devices.

When the UE is implemented as the first UE, the processor and transceiver involved in some embodiments of the present disclosure may execute any one of the methods shown in the aforesaid FIGS. 2 to 5 and executed by the first UE, which will not be repeated herein.

In some embodiments, when the UE is implemented as the first UE, the processor is configured to generate message content through at least one layer of the PC5-S layer and the PC5-RRC layer, and the processor is configured to package the message content into a discovery message through the PC5-S layer.

When the UE is implemented as the second UE, the processor and transceiver involved in some embodiments of the present disclosure may execute any one of the methods shown in the aforesaid FIGS. 2 to 5 and executed by the second UE, which will not be repeated herein.

In some embodiments, when the UE is implemented as the second UE, the transceiver is configured to receive a discovery message broadcast by a first UE through the PC5-S layer, and the processor is configured to analyze the discovery message through at least one of the PC5-S layer or a PC5-RRC layer.

Some embodiments of the present disclosure also provide a computer-readable storage medium, in which a computer program is stored, and the computer program is configured to be execute by a processor of a first UE to realize the generation method for a discovery message of the first UE side.

Some embodiments of the present disclosure also provide a computer-readable storage medium, in which a computer program is stored, and the computer program is configured to be execute by a processor of a second UE to realize the generation method for a discovery message of the second UE side.

In some embodiments, the computer-readable storage medium may include Read-Only Memory (ROM), Random-Access Memory (RAM), Solid State Drive (SSD) or optical disk, etc. Herein, the RAM may include Resistance Random Access Memory (ReRAM) and Dynamic Random Access Memory (DRAM).

Some embodiments of the present disclosure also provide a chip, which includes a programmable logic circuit and/or a program instruction. When being run on the first UE, the chip is configured to realize the generation method for a discovery message of the first UE side.

Some embodiments of the present disclosure also provide a chip, which includes a programmable logic circuit and/or a program instruction. When being run on the second UE, the chip is configured to realize the generation method for a discovery message of the second UE side.

Some embodiments of the present disclosure also provide a computer program product or a computer program, the computer program product or computer program includes a computer instruction, the computer instruction is stored in a computer-readable storage medium, and a processor of a first UE reads and executes the computer instruction from the computer-readable storage medium to realize the generation method for a discovery message of the first UE side.

Some embodiments of the present disclosure also provide a computer program product or a computer program, the computer program product or computer program includes a computer instruction, the computer instruction is stored in a computer-readable storage medium, and a processor of a second UE reads and executes the computer instruction from the computer-readable storage medium to realize the generation method for a discovery message of the second UE side.

It should be understood that the reference to "indicate" in embodiments of the present disclosure may be a direct indication, may be an indirect indication, or may indicate an association relationship. For example, A indicating B may mean that A directly indicates B, for example, B may be obtained through A. It may also mean that A indirectly indicates B, for example, A indicates C, and B may be obtained by C. It may also indicate that there is an association relationship between A and B.

In the description of embodiments of the present disclosure, the term "correspond" may mean that there is a direct correspondence or an indirect correspondence relationship between the two, may also mean that there is an association relationship between the two, or may also be a relationship between indicating and being indicated, configuring and being configured, etc.

"A plurality of" mentioned in the present disclosure refers to two or more. "And/or" describes an association relationship between associated objects and indicates that there may be three kinds of relationships. For example, A and/or B, may indicate that there are three situations: A exists alone, A and B exist at the same time, and B exists alone. The character "/" indicates that the associate objects therebefore and thereafter have a relationship of "or".

In addition, operation numbers described in the present disclosure only shows a possible executing sequence between operations by way of example. In some embodiments, the aforesaid operations may also be executed without following the numbering sequence. For example, two operations with different numbers may be executed at the same time, or two operations with different numbers may be executed in a sequence opposite to that shown the figures, which is not limited by embodiments of the present disclosure.

Those skilled in the art may aware that in the aforesaid one or more embodiments, the functions described in the embodiments of the present disclosure may be implemented in a hardware, a software, a firmware, or any combination thereof. When implemented in the software, the functions may be stored in a computer-readable medium or transmitted as one or more instructions or codes stored in the computer-readable medium. The computer-readable medium includes a computer-storage medium and a communication medium. The communication medium includes any medium that facilitates transmission of computer programs from one place to another. The storage medium may be any available medium that may be accessed by a general purpose or special purpose computer.

The above is only exemplary embodiments of the present disclosure and is not intended to limit the present disclosure. Any modifications, equivalent replacements, improvements, etc., made within the spirit and principles of the present disclosure should be included in the protection scope of the present disclosure.

What is claimed is:

1. A generation method for a discovery message, wherein the method is performed by a first User Equipment (UE), and the method comprises:

generating message content through at least one layer of a PC5-S layer or a PC5-Radio Resource Control (RRC) layer; and packaging the message content as the discovery message through the PC5-S layer, wherein the generating message content through at least one layer of a PC5-S layer or a PC5-RRC layer comprises:

generating first message content through the PC5-S layer, wherein the first message content carries a first relaying-terminal-selection condition; and generating second message content through the PC5-RRC layer, wherein the second message content carries a second relaying-terminal-selection condition:

the packaging the message content as the discovery message through the PC5-S layer comprises:

packaging the second message content in a PC5-RRC container through the PC5-RRC layer and transmitting the PC5-RRC container to the PC5-S layer; and packaging the PC5-RRC container and the first message content as a third discovery message through the PC5-S layer:

wherein the first relaying-terminal-selection condition is a relaying-terminal-selection condition commonly used for layer-two relays and layer-three relays, and the relaying-terminal-selection condition is configured for a peer terminal of the first UE to perform a relaying selection;

or, the generating message content through at least one layer of a PC5-S layer or a PC5-RRC layer, comprises:

generating second message content through the PC5-RRC layer, wherein the second message content carries a second relaying-terminal-selection condition;

the packaging the message content as the discovery message through the PC5-S layer, comprises:

packaging the second message content in a PC5-RRC container through the PC5-RRC layer and transmitting the PC5-RRC container to the PC5-S layer; and packaging the PC5-RRC container as a second discovery message through the PC5-S layer;

wherein the second relaying-terminal-selection condition is a relaying-terminal-selection condition specially used for layer-two relays, and the relaying-terminal-selection condition is configured for the peer terminal of the first UE to perform a relaying selection.

2. The method according to claim 1, wherein the first message content and the second message content correspond to different layer-two identifiers.

3. The method according to claim 1, wherein the packaging the second message content in a PC5-RRC container through the PC5-RRC layer and transmitting the PC5-RRC container to the PC5-S layer, comprises:

packaging the second message content in the PC5-RRC container through the PC5-RRC layer and cutting the PC5-RRC container into at least two container fragments; and transmitting the container fragments to the PC5-S layer through the PC5-RRC layer.

4. The method according to claim 3, wherein the transmitting the container fragments to the PC5-S layer through the PC5-RRC layer, comprises:

numbering the container fragments through the PC5-RRC layer; and transmitting the container fragments carrying corresponding numbers to the PC5-S layer through the PC5-RRC layer.

5. The method according to claim 4, further comprising:

receiving, through a Physical Sidelink Feedback Channel (PSFCH), retransmission-indicating information fed back by a second UE, wherein the retransmission-indicating information carries a number corresponding to at least one of the container fragments; and transmitting a fourth discovery message to the second UE through the PC5-S layer, wherein the at least one of the container fragments corresponding to the number is packaged in the fourth discovery message; and wherein the second UE is the peer terminal of the first UE.

6. The method according to claim 1, wherein the first relaying-terminal-selection condition comprises at least one of:

a serving-cell identification;

a Public Land Mobile Network (PLMN) identification;

a supported-relaying-type indication;

a load condition indication;

a non-serving-cell identification; or an inter-PLMN identification.

7. The method according to claim 1, wherein the second relaying-terminal-selection condition comprises at least one of:

a serving-cell identification;

a PLMN identification;

a supported-relaying-type indication;

a load condition indication;

a non-serving-cell identification; or an inter-PLMN identification.

8. The method according to claim 1, further comprising:

broadcasting the discovery message through the PC5-S layer.

9. The method according to claim 1, wherein the discovery message carrying a PC5-RRC container and the discovery message not carrying a PC5-RRC container correspond to different Sidelink-Single Radio Bearers (SL-SRBs); or the discovery message packaged from the message content directly generated by the PC5-S layer and the discovery message packaged from the message content directly generated by the PC5-RRC layer correspond to different SL-SRBs.

10. The method according to claim 1, wherein the discovery message carrying a PC5-RRC container and the discovery message not carrying a PC5-RRC container correspond to different transmitting-resource pools; or the discovery message packaged from the message content directly generated by the PC5-S layer and the discovery message packaged from the message content directly generated by the PC5-RRC layer correspond to different transmitting-resource pools.

11. An analysis method for a discovery message, wherein the method is performed by a second User Equipment (UE), and the method comprises:

receiving, through a PC5-S layer, the discovery message broadcast by a first UE; and analyzing the discovery message through at least one layer of the PC5-S layer or a PC5-Radio Resource Control (RRC) layer, wherein the analyzing the discovery message through at least one layer of the PC5-S layer or a PC5-RRC layer, comprises:

analyzing a first discovery message through the PC5-S layer and obtaining first message content, wherein the first message content carries a first relaying-terminal-selection condition, wherein the first relaying-terminal-selection condition is a relaying-terminal-selection condition commonly used for layer-two relays and layer-three relays, and the relaying-terminal-selection condition is configured for a peer terminal of the second UE to perform a relaying selection;

or, the analyzing the discovery message through at least one layer of the PC5-S layer or a PC5-RRC layer comprises:

analyzing a second discovery message through the PC5-S layer, obtaining a PC5-RRC container, and transmitting the PC5-RRC container to the PC5-RRC layer; and analyzing the PC5-RRC container through the PC5-RRC layer and obtaining second message content, wherein the second message content carries a second relaying-terminal-selection condition, wherein the second relaying-terminal-selection condition is a relaying-terminal-selection condition specially used for layer-two relays and the relaying-terminal-selection condition is configured for the peer terminal of the second UE to perform a relaying selection.

12. The method according to claim 11, wherein the PC5-RRC container comprises at least two container fragments; and the transmitting the PC5-RRC container to the PC5-RRC layer, comprises:

assembling the container fragments into the PC5-RRC container through the PC5-S layer and transmitting the PC5-RRC container to the PC5-RRC layer.

13. The method according to claim 11, wherein the first relaying-terminal-selection condition comprises at least one of:

a serving-cell identification;

a Public Land Mobile Network (PLMN) identification;

a supported-relaying-type indication;

a load condition indication;

a non-serving-cell identification; or an inter-PLMN identification.

14. The method according to claim 11, wherein the second relaying-terminal-selection condition comprises at least one of:

a serving-cell identification;

a PLMN identification;

a supported-relaying-type indication;

a load condition indication;

a non-serving-cell identification; or an inter-PLMN identification.

15. A User Equipment (UE), wherein the UE comprises a processor;

the processor is configured to generate message content through at least one layer of a PC5-S layer or a PC5-Radio Resource Control (RRC) layer; and the processor is configured to package the message content as a discovery message through the PC5-S layer, wherein the processor is further configured to:

generate first message content through the PC5-S layer wherein the first message content carries a first relaying-terminal-selection condition;

generate second message content through the PC5-RRC layer, wherein the second message content carries a second relaying-terminal-selection condition;

package the second message content in a PC5-RRC container through the PC5-RRC layer and transmitting the PC5-RRC container to the PC5-S layer; and package the PC5-RRC container and the first message content as a third discovery message through the PC5-S layer:

wherein the first relaying-terminal-selection condition is a relaying-terminal-selection condition commonly used for layer-two relays and layer-three relays, and the relaying-terminal-selection condition is configured for a peer terminal of the UE to perform a relaying selection;

or, the processor is further configured to:

generate second message content through the PC5-RRC layer, wherein the second message content carries a second relaying-terminal-selection condition;

package the second message content in a PC5-RRC container through the PC5-RRC layer and transmitting the PC5-RRC container to the PC5-S layer; and package the PC5-RRC container as a second discovery message through the PC5-S layer;

wherein the second relaying-terminal-selection condition is a relaying-terminal-selection condition specially used for layer-two relays, and the relaying-terminal-selection condition is configured for the peer terminal of the UE to perform a relaying selection.

* * * * *